United States Patent
Eaton et al.

(10) Patent No.: US 7,808,734 B2
(45) Date of Patent: Oct. 5, 2010

(54) MONITORING A FLY HEIGHT OF A MAGNETIC TRANSDUCER

(75) Inventors: Robert E. Eaton, San Jose, CA (US); Hai C. Nguy, San Jose, CA (US); Jeffrey R. Williams, Aptos, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 511 days.

(21) Appl. No.: 11/894,360

(22) Filed: Aug. 20, 2007

(65) Prior Publication Data

US 2009/0052080 A1 Feb. 26, 2009

(51) Int. Cl.
G11B 27/36 (2006.01)
(52) U.S. Cl. ........................................ 360/31; 360/75
(58) Field of Classification Search ........................ None
See application file for complete search history.

(56) References Cited

U.S. PATENT DOCUMENTS

| 5,410,439 | A  | * | 4/1995  | Egbert et al. ............... 360/75  |
| 6,100,683 | A  | * | 8/2000  | Lim et al. .................. 324/212 |
| 6,178,053 | B1 | * | 1/2001  | Narita ........................ 360/25 |
| 7,016,131 | B2 | * | 3/2006  | Liu et al. .................... 360/31 |
| 7,365,931 | B2 | * | 4/2008  | Ikai et al. ................... 360/75 |
| 7,440,217 | B2 | * | 10/2008 | Ono et al. ................... 360/75 |
| 2007/0127147 | A1 | * | 6/2007 | Yokohata et al. ............ 360/31 |

FOREIGN PATENT DOCUMENTS

JP    2003308670 A    * 10/2003

* cited by examiner

*Primary Examiner*—Jason C Olson

(57) ABSTRACT

A method for monitoring a fly height of a magnetic transducer comprises flying the magnetic transducer at a distance of separation from a recording media. The fly height is modulated with a predetermined modulation frequency with a fly height control device. A read-back signal is read from the recording media with the magnetic transducer. A change of the read back signal is measured that results from modulating the fly height. A fault signal is provided in response to the change crossing a threshold.

23 Claims, 5 Drawing Sheets

MONITORING A FLY HEIGHT OF A MAGNETIC TRANSDUCER

TECHNICAL FIELD

This invention relates generally to the field of direct access storage devices and in particular to the monitoring a fly height of a magnetic transducer by power spectrum analysis of the read-back signal.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well known physical principles. There exists a direct correlation between the distance that a magnetic transducer is spaced from the recording media and the amount of data that can be stored on the disk. This distance is typically known as "fly height." This relationship is expressed by the Wallace equation, which is well understood in the art of magnetic recording. The Wallace equation teaches that as fly height increases, the amount of data that can be stored on the media decreases. Conversely, as fly height decreases, the amount of data that can be stored on the media increases. The Wallace equation expresses the importance of controlling fly height so that data density can be controlled.

Historically, fly height of a magnetic transducer has been controlled through the design of the slider, upon which the magnetic transducer is coupled. The slider comprises a surface known as an ABS (air bearing surface) which in operation faces the media of a magnetic recording disk. The ABS is patterned and configured such that as the disk spins adjacent to the ABS, a film of air is created which provides spacing and support for the magnetic transducer away from the spinning disk media. The ABS is designed using well understood principles of aerodynamics and fluid flow.

The ever increasing demand for data density has made the small variations in fly height, which are inherently caused by manufacturing tolerances and the operating environment of the HDD, unacceptable. The ABS by itself can no longer keep pace with demands for increased data density. The Wallace equation implies that increased data density requires decreased fly height. Decreased fly height creates challenges for reliability and increases the risk of a head crash and lost data.

SUMMARY OF THE INVENTION

Various embodiments of the present invention are described herein. A method for monitoring a fly height of a magnetic transducer comprises flying the magnetic transducer at a distance of separation from a recording media. The fly height is modulated with a predetermined modulation frequency with a fly height control device. A read-back signal is read from the recording media with the magnetic transducer. A change of the read back signal is measured that results from modulating the fly height. A fault signal is provided in response to the change crossing a threshold.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a head stack assembly (HSA) having an arm electronics (A/E) module whereby desirable performance of an HDD can be enabled by embodiments of the present invention. The discussion will then focus on embodiments of the present invention by which an A/E module is enabled to monitor the fly height of a magnetic transducer. The implementation of embodiments of the present invention will then be discussed.

Overview

Figure 1:
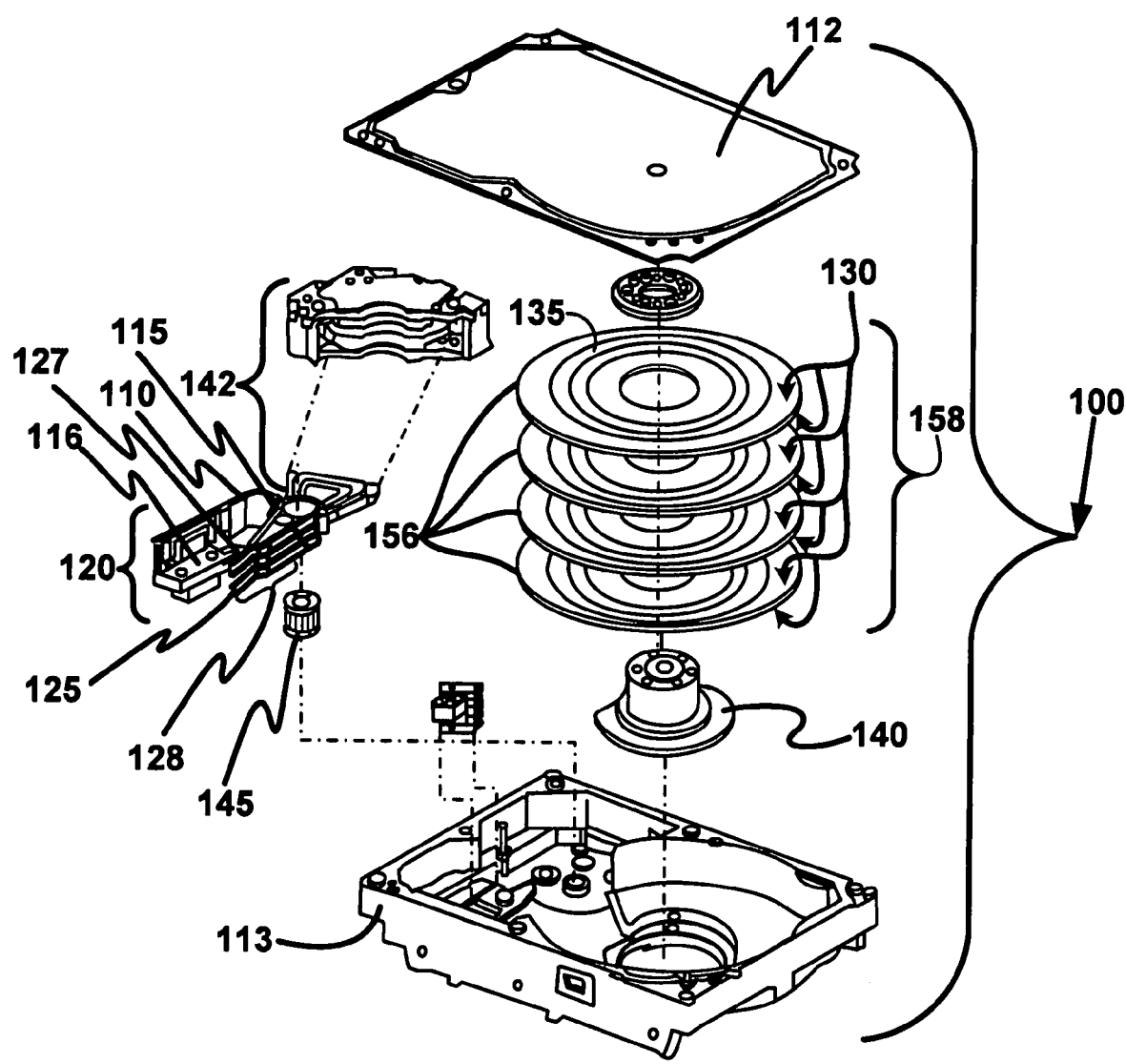
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, sometimes referred to as an actuator assembly, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and A/E module 115.

HSA 120 is coupled pivotally with base casting 113 by means of pivot bearing 145, such that VCM 142 can move HGA 128 with slider 125 accurately across disk surface 130. Upon assembly of HSA 120, disk stack 158, VCM 142, and other components with base casting 113, cover 112 is coupled with base casting 113 to enclose these components and subassemblies into HDD 100.

Figure 2:
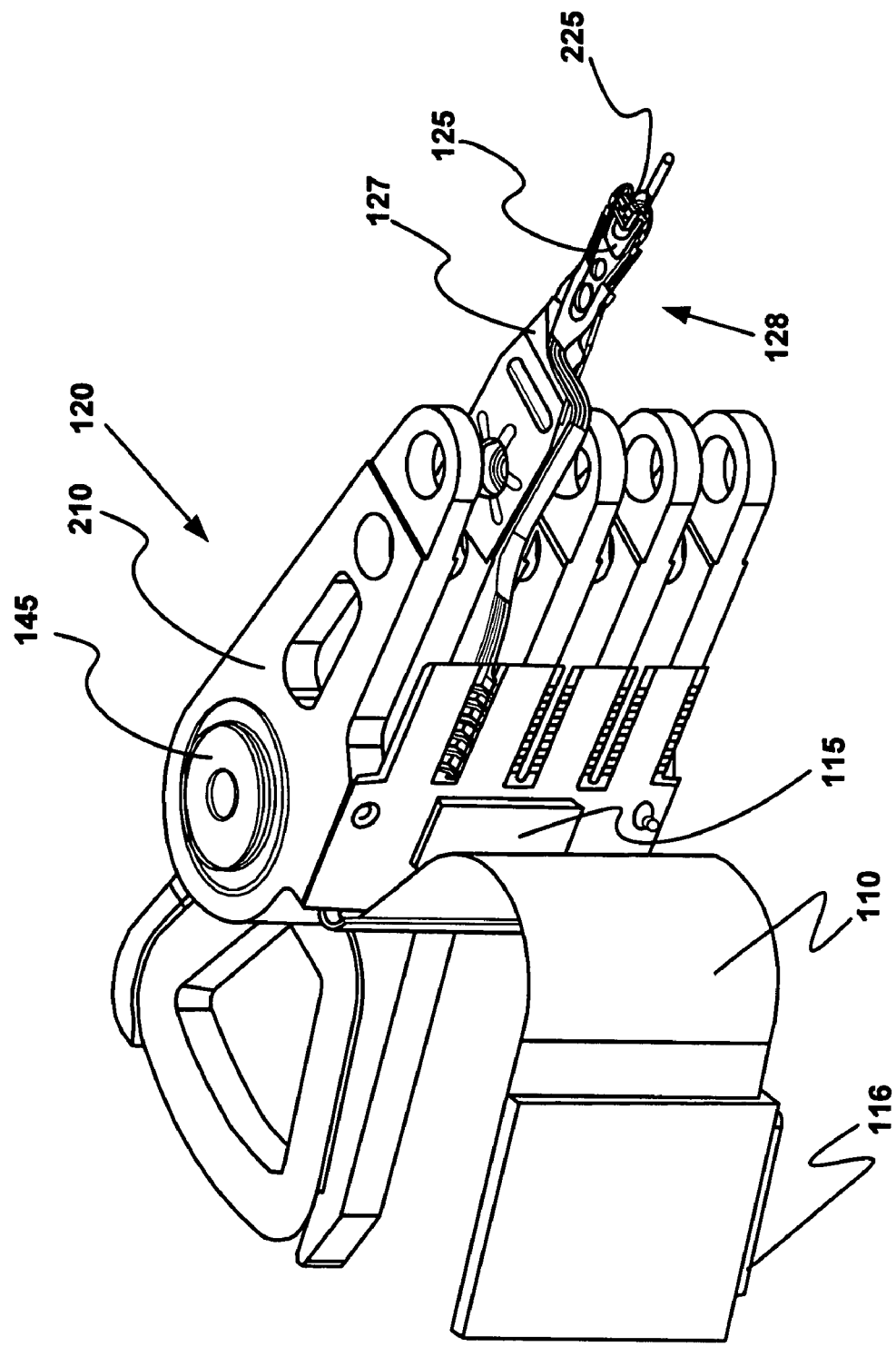
FIG. 2 is an isometric of head stack assembly (HSA) in accordance with one embodiment of the present invention.

With reference to FIG. 2 an isometric of a head stack assembly (HSA) 120 is presented in accordance with one embodiment of the present invention. Many of the elements of FIG. 2 are also presented in FIG. 1. For the sake of clarity, they are presented in more detail in FIG. 2.

HSA 120 comprises comb 210. At least one HGA 128 is coupled with comb 210. For the sake of brevity and clarity, one HGA 128 is presented in FIG. 2. It is obvious that a plurality of HGAs can be added to comb 210 without detracting from the embodiment of the present invention. HGA 128 comprises suspension 127 and slider 125, wherein magnetic transducer 225 is coupled. Magnetic transducer 225 reads and writes data tracks 135 onto surface 130 of disk 156. Pivot bearing 145 is coupled with HSA 120 and to base casting 113 thus allowing HSA 120 to move magnetic transducer 225 arcuately across data tracks 135.

Since magnetic transducer 225 is coupled with slider 125, the distance of separation, or fly height, at which magnetic transducer 225 flies is determined primarily by the ABS of slider 125. It is appreciated that other parameters of HDD 100 determine the fly height of magnetic transducer 225. The design and fabrication of the ABS sets the fly height of the slider for nominal operating conditions. The fly height is tested in the factory and the slider with its coupled magnetic transducer is shipped as part of an HDD to the customer. The fly height of the magnetic transducer is influenced by many randomly occurring factors beyond the control of the ABS and HDD designers. Examples of these factors are: temperature, atmospheric pressure, contamination, and mechanical shock.

Changes in fly height can affect the performance of the HDD. If the magnetic transducer flies too high, the amplitude of the read-back signal becomes too weak against background noise. If the magnetic transducer flies too low, there is the exposure and risk of the magnetic transducer contacting the disk. The consequences of contacting the disk can range from a perturbation in the read-back signal, necessitating a retry to read data, to a catastrophic head crash, whereby the disk surface is damaged and a customer's data is destroyed.

There has been a long felt need in the HDD art to have a means for adjusting fly height. Some examples of means for adjusting fly height are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with the magnetic transducer to urge the magnetic transducer closer to the magnetic recording media.

The above examples of means for adjusting fly height are designed to increase or decrease the fly height of the magnetic transducer in preparation for a specific function of an HDD such as reading data tracks and writing data tracks. The embodiments of the present invention provide a means for an HDD to react to a change in the operating conditions of the HDD and adjust the fly height appropriately. The embodiments of the present invention are operable for all means for adjusting fly height in an HDD.

Physical Description

Figure 3:
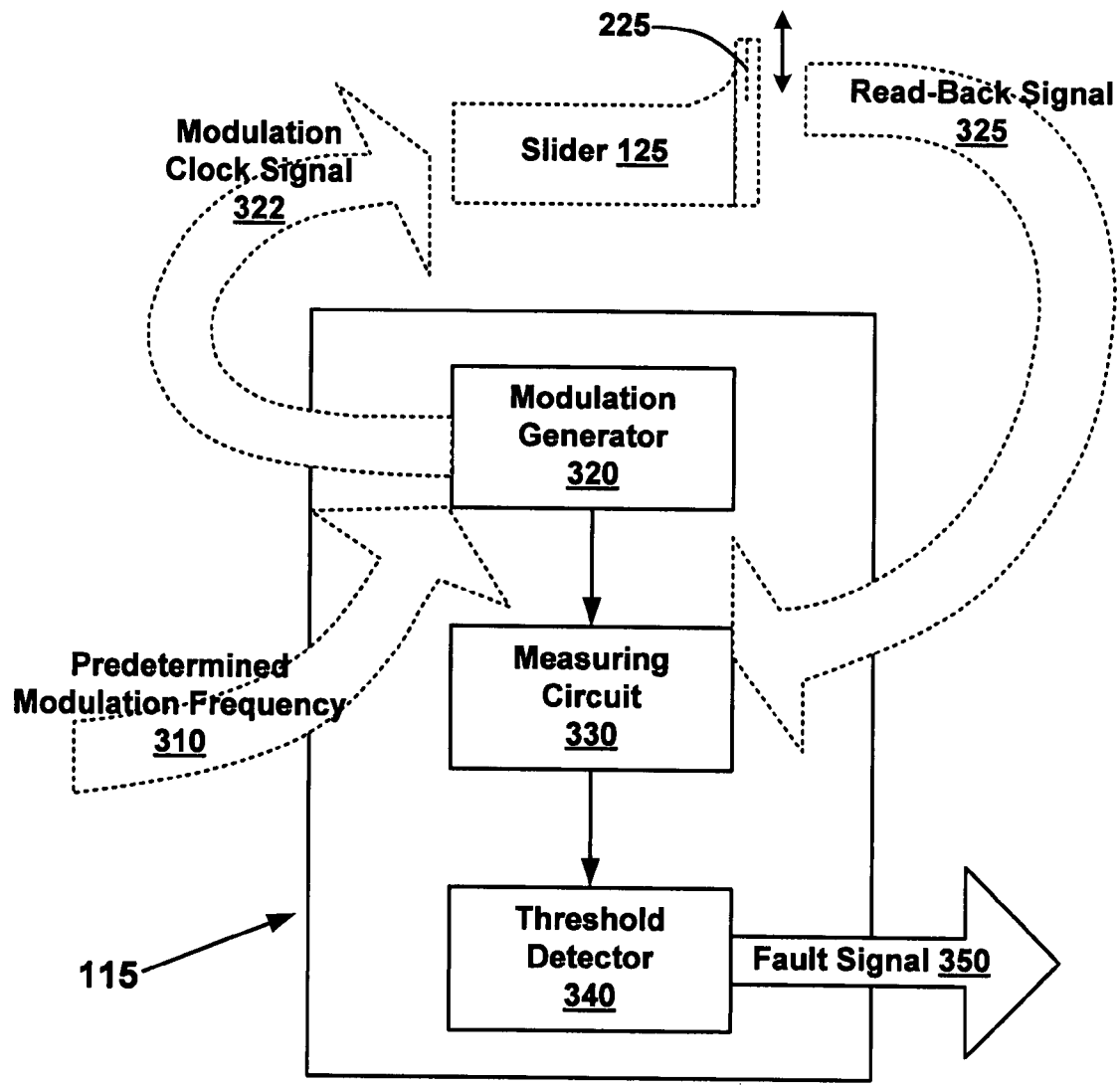
FIG. 3 is a block diagram illustrating an arm electronics (A/E) module operable for monitoring a fly height of a magnetic transducer in accordance with one embodiment of the present invention.

With reference to FIG. 3, a block diagram illustrating arm electronics (A/E) module 115 operable for monitoring a fly height of magnetic transducer 225 is presented in accordance with one embodiment of the present invention. A/E module 115 is operable for receiving read-back signal 325 from magnetic transducer 225 while coupled with HDD 100. A/E module 115 comprises modulation generator 320 operable for receiving predetermined modulation frequency 310 and operable for providing modulation clock signal 322 to a fly height control device. Modulation generator 320 is further operable for providing a modulation clock quadrature signal to a modulation processor comprised within measuring circuit 330. A/E module 115 comprises measuring circuit 330 operable for measuring a change in read-back signal 325. In accordance with an embodiment of the present invention, measuring circuit 330 is operable to measuring a change in resistance of a magnetic transducer. A/E module 115 comprises threshold detector 340 operable for providing fault signal 350 coupled with a threshold of the change in read-back signal 325. Although the A/E module 115 is stated herein as operable for monitoring the fly height of magnetic transducer 225, the present technology may be performed at other electronics modules. For example, the read-back signal from the magnetic transducer may be received at the read channel, the controller or the like within HDD 100. Thus, the description with respect to the utilization of the A/E module 115 herein is provided merely for purposes of clarity.

Modulation clock signal 322 is designed to modulate a means for adjusting fly height. In accordance with an embodiment of the present invention, and as presented in FIG. 3, a means for adjusting fly height is a TFC coupled with slider 125.

It should be appreciated that a TFC device is one of several means operable for adjusting fly height in accordance with embodiments of the present invention. Some examples of means for adjusting fly height include: a PZT coupled with a suspension to deflect the suspension and urge the magnetic transducer closer to or further from the magnetic recording media; a shape memory alloy, also known as SMA and NITINOL, coupled with a suspension to deflect the suspension and urge the magnetic transducer closer to or further from the magnetic recording media; and a PZT coupled with a slider to deflect the slider and urge the magnetic transducer closer to or further from the magnetic recording media. These examples of means for adjusting fly height are presented only for clarification and are not intended to be an exhaustive list of means for adjusting fly height. This list is not intended to limit the scope of the embodiments of the present invention but is presented to demonstrate that the embodiments of the present invention are applicable to all means for adjusting fly height.

In accordance with an embodiment of the present invention, measuring circuit 330 measures a change in read-back signal in response to altering the fly height of magnetic transducer 225. The fly height of magnetic transducer 225 is altered by a fly height control device such as a TFC, in response to modulation clock signal 322.

In accordance with an embodiment of the present invention, measuring circuit 330 comprises a splitter operable for splitting read-back signal 325 into a first branch and a second branch. Measuring circuit 330 comprises a first multiplier operable for multiplying the first branch by modulation clock signal 322 effecting a fly height modulation. Measuring circuit 330 comprises a modulation processor operable for presenting a fly height amplitude to measuring circuit 330 resulting from the fly height modulation effected by the first multiplier, first branch of read-back signal 325, and modulation clock signal 322. In accordance with an embodiment of the present invention measuring circuit 330 comprises a filter operable for passing at least one mechanical frequency, either natural or induced, of said magnetic transducer, and whose frequency is equal to that of the modulation clock signal 322.

In accordance with an embodiment of the present invention measuring circuit 330 also comprises a rectifier for demodulating said read-back signal 325. A wave form such as that of read-back signal 325 may be rectified by any means such as diode(s), Schottky diode(s), Zener diode(s), all of these examples of rectifiers being full wave rectifiers and half wave rectifiers.

In accordance with an embodiment of the present invention, measuring circuit 330 also comprises a second multiplier operable for multiplying the second branch by the modulation clock quadrature signal operably provided by modulation generator 320. When in operation, multiplying of the second branch by the modulation clock quadrature signal results in a fly height modulation quadrature. In accordance with an embodiment of the present invention, measuring circuit 330 also comprises a modulation processor operable for presenting a fly height modulation phase from the fly height modulation quadrature.

Threshold detector 340 is any one of threshold detectors well known in the art. Examples of threshold detector 340 are: a simple peak amplitude detector, a peak amplitude threshold detector with timing qualification, an RMS threshold detector, and an integrator threshold detector.

In accordance with an embodiment of the present invention, threshold detector 340 is coupled with an output port. Threshold detector 340 is operable for detecting at least one occurrence of at least one mechanical frequency of a magnetic transducer, which is coupled with a slider. The output port is operable for conveying fault signal 350 from threshold detector 340 to other electronic devices such as a controller of HDD 100. The mechanical frequency of magnetic transducer 225 can be associated with modulation clock signal 322 or any other known frequency which excites a mechanical frequency of the magnetic transducer 225 and/or slider 125.

In accordance with an embodiment of the present invention, measuring circuit 330 comprises phase lock loop.

Figure 4:
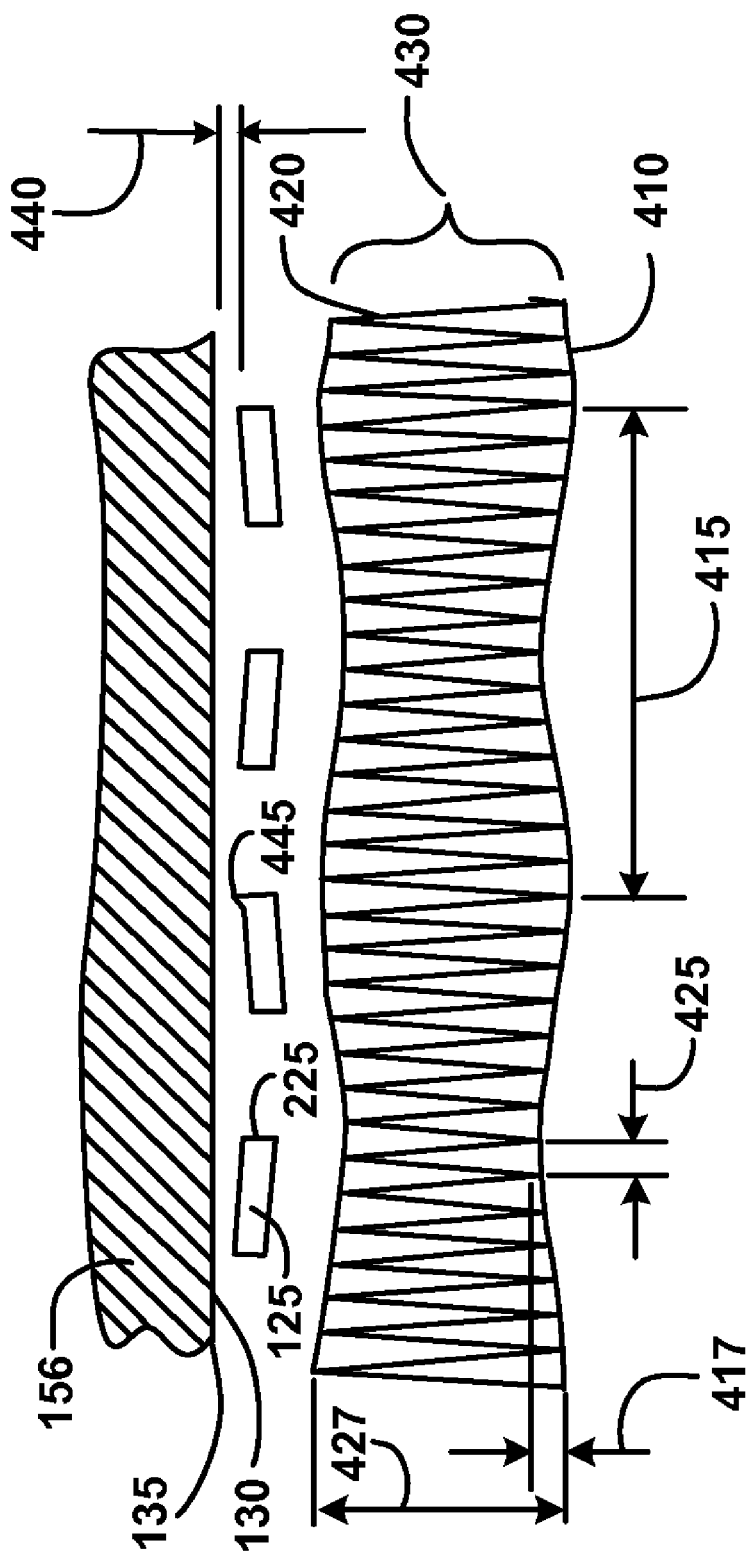
FIG. 4 is a side view of a flying slider and a read-back signal in accordance with one embodiment of the present invention.

With reference to FIG. 4, a side view of slider 125 flying adjacent to data track 135 on disk 156, and a resulting read-back signal 430 are presented in accordance with one embodiment of the present invention. In accordance with an embodiment of the present invention, read-back signal (325, 430) comprises data frequency 420 associated with data written on data tracks 135, and modulation frequency 410 associated with modulation of magnetic transducer 225.

Modulation frequency 410 is defined by predetermined modulation frequency 310 in FIG. 3. Predetermined modulation frequency 310 and hence modulation frequency 410 is chosen to be near or below the response frequency of the fly height control device being used in HDD 100. The range of frequency 415 coupled with modulation frequency 410, which is associated with predetermined modulation frequency 310, is dependent upon the response frequency and the bandwidth for detection. The range of frequency 425 coupled with data frequency 420, which is associated with data written on data tracks 135, is typically higher than range of frequency 415. The range of frequency 425 can be between 100 MHz to 2 GHz. In accordance with an embodiment of the present invention, and as presented in FIG. 4, the fly height control device is a TFC. For a TFC, the range of frequency 415 can be between the rotational frequency of the disk and 20 KHz. It should be appreciated that a TFC device is one of several means operable for adjusting fly height in accordance with embodiments of the present invention.

The TFC, as presented in FIG. 4, is modulated by modulation clock signal 322, which results in protuberance 445 modulating. Protuberance 445 comprises magnetic transducer 225 and causes magnetic transducer 225 to cycle between being closer and being farther from data track 135. In accordance with the Wallace equation, read-back signal (325, 430), which is read by magnetic transducer 225 fluctuates at modulation frequency 410, which is coupled with modulation clock signal 322. Modulation frequency 410 of magnetic transducer 225 is superimposed onto data frequency 420 associated with data written on data tracks 135. The modulation in the height of protuberance 445 at the modulation frequency is usually less than 3% of the average fly height 440. Per the Wallace equation, amplitude modulation 417 of modulation frequency 410 is small in comparison to amplitude 427 of data frequency 420. The smallness of amplitude modulation 417 typically would cause modulation frequency 410 to be undetectable in read-back signal (325, 430) and would normally be considered as background noise.

The predetermined modulation frequency 310, and hence modulation frequency 410, is chosen to be at or below the response frequency of the fly height control device, such as TFC. Predetermined modulation frequency 310 is typically in a range of the rotational frequency of the disk to 20 KHz. The amplitude of predetermined modulation frequency 310 is known and within the limits of the fly height control device such as TFC. Since predetermined modulation frequency 310 has a known frequency and amplitude, predetermined modulation frequency 310 becomes very easy to detect accurately with synchronous detection and a lock-in amplifier.

Amplitude modulation 417 associated with modulation frequency 410 and magnetic transducer 225 is constant during constant power to TFC and constant fly height 440. Fly height 440 can change due to the influence of randomly occurring variables such as temperature, atmospheric pressure, contamination, and mechanical shock. If fly height 440 were to decrease, amplitude modulation 417 would decrease as fly height 440 approaches the height of protuberance 445. As fly height 440 approaches the height of protuberance 445, amplitude modulation 417 will decrease as the stiffness of the air bearing increases just before contact. Under this condition contact with protuberance 445 is imminent or in progress with disk surface 130.

In accordance with another embodiment of the present invention, magnetic transducer 225 comprises a magnetoresistive sensor and the means for adjusting fly height comprises a TFC. The heat associated with operation of the TFC is in part dissipated through conduction into slider 125 and convection with the air that separates slider 125 from disk surface 130. The resistance of the magnetoresistive sensor remains constant as the heat transferred from the TFC is constant. Heat transfer from the TFC is constant during constant power to TFC and constant fly height 440. Fly height 440 can decrease due to the influence of randomly occurring variables such as temperature, atmospheric pressure, contamination, and mechanical shock. If fly height 440 were to decrease, the heat transfer from the air that separates slider 125 from disk surface 130 would increase into disk 156 and the temperature of magnetoresistive sensor would decrease thus reducing the resistance of the magnetoresistive sensor. As fly height 440 approaches the height of protuberance 445, the heat in magnetoresistive sensor increases due to frictional heating between protuberance 445 and disk surface 130. Under this condition contact with protuberance 445 is imminent or in progress with disk surface 130.

In accordance with another embodiment of the present invention, read-back signal (325, 430) comprises signal noise inherent in disk 156, and modulation frequency 410 associated with at least one mechanical frequency of magnetic transducer 225. The mechanical frequency of magnetic transducer 225 can be associated with modulation clock signal 322 or any other known frequency which excites a mechanical frequency of the magnetic transducer 225 and/or slider 125. Magnetic transducer 225 reads noise from a disk surface 130 with or without the presence of data tracks 135. The mechanical frequency of the magnetic transducer 225, which is coupled with slider 125, includes the mechanical frequency of slider 125. This is due in part to the changes in fly height 440 experienced by magnetic transducer 225 during vibration of slider 125. As slider 125 vibrates magnetic transducer 225 cycles between being closer and being farther from data track 135. In accordance with the Wallace equation, read-back signal (325, 430), which is read by magnetic transducer 225, fluctuates at modulation frequency 410 of slider 125. Without the presence of data tracks 135, modulation frequency 410 of slider 125 is superimposed onto signal noise inherent in disk 156. With the presence of data tracks 135, modulation frequency 410 of slider 125 is superimposed onto signal noise inherent in disk 156 and data frequency 420 associated with data written on data tracks 135.

In accordance with embodiments of the present invention, fly height 440 of slider 125 and magnetic transducer 225 can be monitored by the enablement of the present invention. Processing and analyzing read-back signal (325, 430) in accordance with the Wallace equation, synchronous detection and a lock-in amplifier, and analyzing the resistance of a magnetoresistive sensor, enabled A/E module 115 to monitor fly height of a magnetic transducer in accordance with embodiments of the present invention.

Operation

Figure 5:
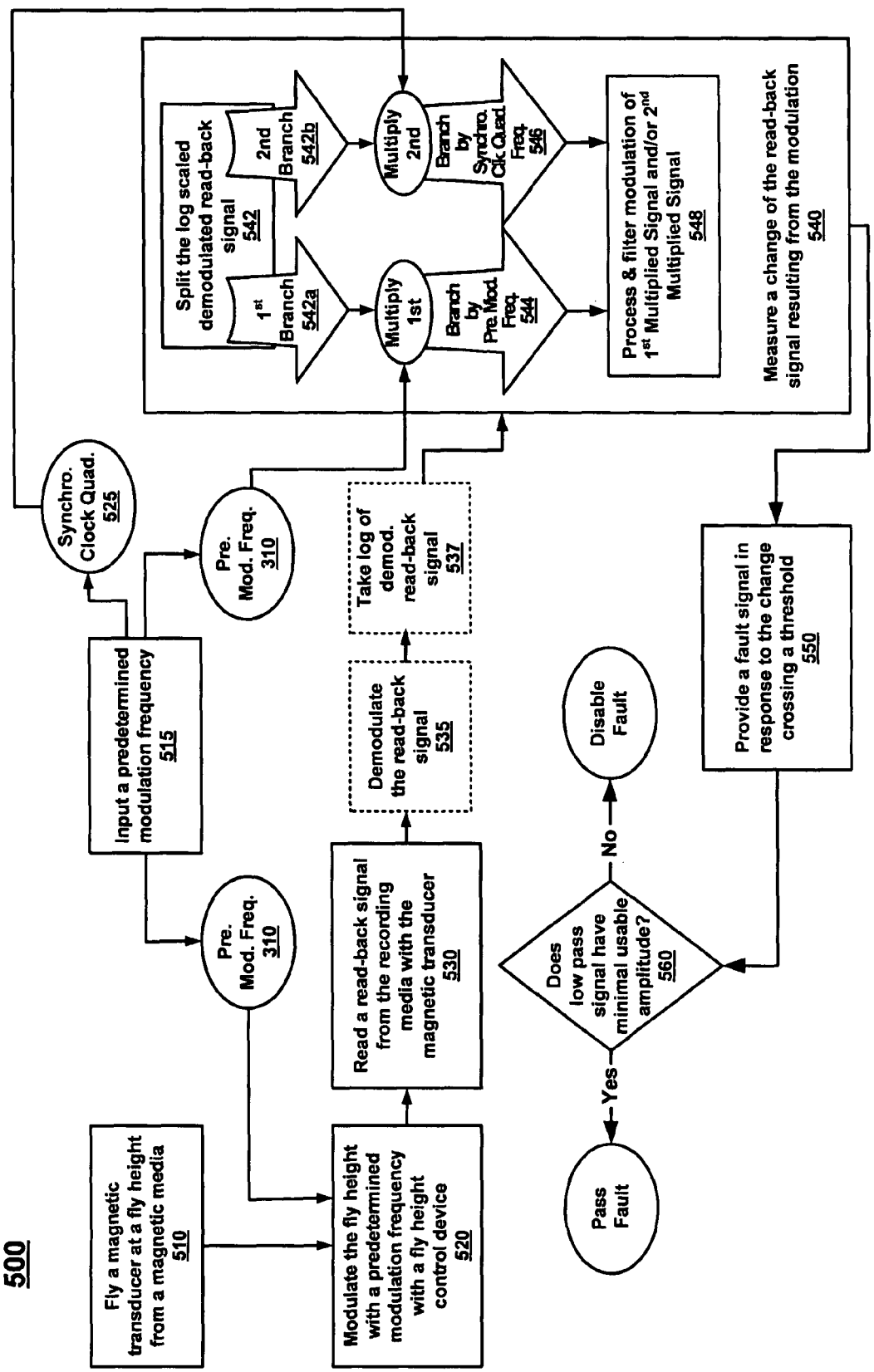
FIG. 5 is a flow chart illustrating a process for monitoring a fly height of a magnetic transducer in accordance with one embodiment of the present invention.

FIG. 5 is a flow chart illustrating a process 500 for monitoring a fly height of a magnetic transducer, in accordance with an embodiment of the present invention. In accordance with an embodiment of the present invention, process 500 for monitoring a fly height of a magnetic transducer is performed within an HDD while magnetic transducer 225 is in use by an end user. In accordance with an embodiment of the present invention process 500 is performed on a spin stand in a factory environment for testing, adjusting, calibrating, and monitoring a fly height of a magnetic transducer. In accordance with an embodiment of the present invention, process 500 is performed prior to and during servo-write for the benefit of enhancing the reliability of the HDD. An example of this benefit is to adjust the fly-height as close to the disk as possible without causing damage to the disk, and thusly write servo data with the largest amplitude possible and with the least modulation. By having optimized servo data, a customer's data is located faster due to fewer attempts at reading the servo data and thusly enhances the reliability of the servo system and the HDD.

In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 1, FIG. 3, and FIG. 4.

In one embodiment, as shown at 510 of process 500, magnetic transducer 225 is flown at a distance of separation (fly height 440) from magnetic media on disk surface 130. In accordance with an embodiment of the present invention, magnetic transducer 225 is coupled with slider 125, which is coupled with a thermal fly height control (TFC) device. It should be appreciated that a TFC device is one of several means operable for adjusting fly height in accordance with embodiments of the present invention. Some examples of means for adjusting fly height include, but are not limited to: a PZT coupled with a suspension to deflect the suspension and urge the magnetic transducer closer to or further from the magnetic recording media; a shape memory alloy, also known as SMA and NITINOL, coupled with a suspension to deflect the suspension and urge the magnetic transducer closer to or further from the magnetic recording media; and a PZT coupled with a slider to deflect the slider and urge the magnetic transducer closer to or further from the magnetic recording media.

In accordance with an embodiment of the present invention, and at 510 of process 500, magnetic transducer 225 is coupled to HDD 100 during operation of HDD 100 in an end user environment. In accordance with an embodiment of the present invention, and at 510 of process 500, flying magnetic transducer 225 at fly height 440 from disk surface 130 is performed on a spin stand in a factory environment. In accordance with an embodiment of the present invention, and at 510 of process 500, flying magnetic transducer 225 at fly height 440 from disk surface 130 is performed prior to and during servo-write of disk stack 158. An example of a benefit to performing component 510 of process 500 before and during servo-write is to adjust the fly-height of magnetic transducer 225 as close to disk surface 130 as possible without causing damage to the disk surface 130. By doing so, servo data is written with the largest amplitude possible and with the least modulation. By having optimized servo data, a customer's data is located faster due to fewer attempts at reading the servo data and thusly enhances the reliability of the servo system and the HDD.

In one embodiment, as shown at 515 of process 500, predetermined modulation frequency 310 is entered into process 500. Predetermined modulation frequency 310 is coupled with process 500 at element 520 and element 544. The predetermined modulation frequency 310, and hence modulation frequency 410, is chosen to be at or below the response frequency of the fly height control device, such as TFC. Predetermined modulation frequency 310 is typically in a range of 10 KHz to 20 KHz. The amplitude of predetermined modulation frequency 310 is known and within the limits of the fly height control device such as TFC. Since predetermined modulation frequency 310 has a known frequency and amplitude, predetermined modulation frequency 310 becomes very easy to detect accurately with synchronous detection and a lock-in amplifier. In accordance with an embodiment of the present invention, and as shown at 515 of process 500, synchronous clock quadrature 525 is provided along with predetermined modulation frequency 515. Synchronous clock quadrature 525 is presented to element 546 of process 500.

In one embodiment, as shown at 520 of process 500, fly height 440 is modulated with predetermined modulation frequency 310. Predetermined modulation frequency 310 comprises frequency and amplitude. Modulation generator 320 receives predetermined modulation frequency 310 and provides modulation clock signal 322 to a fly height control device. Modulation clock signal 322 is scaled according to predetermined modulation frequency 310. In accordance with an embodiment of the present invention, the fly height control device comprises a TFC. TFC is modulated typically at a frequency in the range of 10 KHz to 20 KHz.

In accordance with another embodiment of the present invention, modulation clock signal 322 is sent to a summer, wherein modulation clock signal 322 is added to the input of the fly height control device. The output of the summer is provided to the fly height control device whereby a base fly height with an applied fly height modulation is set.

In one embodiment, as shown at 530 of process 500, read-back signal (325, 430) is read from the magnetic media on disk surface 130 with magnetic transducer 225. In accordance with an embodiment of the present invention, read-back signal (325, 430) comprises data frequency 420 associated with data written on data tracks 135, signal noise inherent in disk 156, and modulation frequency 410 associated with at least one mechanical frequency of magnetic transducer 225. In accordance with another embodiment of the present invention, read-back signal (325, 430) comprises signal noise inherent in disk 156, modulation frequency 410 associated with at least one mechanical frequency of magnetic transducer 225, and no data frequency 420 associated with data written on data tracks 135. Read-back signal (325, 430) devoid of data frequency 420 exists prior to servo-writing disk stack 158.

In accordance with another embodiment, as shown at 535 of process 500, read-back signal (325, 430) is demodulated. Read-back signal (325, 430) is converted to an instantaneous True RMS or an approximation of the signal RMS. Read-back signal (325, 430) may be demodulated (rectified) by any means such as diode(s), Schottky diode(s), Zener diode(s), all of these examples of rectifiers being full wave rectifiers and half wave rectifiers. A rectified signal can be operated upon by other devices such as measuring circuit 330. The rectified signal can be converted into equivalent nanometer fly height spacing in accordance with the Wallace equation.

In accordance with another embodiment, as shown at 537 of process 500, the log is taken of the demodulated read-back signal from element 535. The log of the demodulated read-back signal is presented to element 540 wherein a change is measured of the read-back signal resulting from the modulation of fly height 440.

In one embodiment, as shown at 540 of process 500, read-back signal (325, 430) received from magnetic transducer 225 is measured with measuring circuit 330 for change resulting from modulating fly height 440. In accordance with an embodiment of the present invention, element 540 comprises a feed back loop for measuring a change resulting from modulating fly height 440

In one embodiment, element 540 of process 500 further comprises 542, split the log scaled demodulation read-back signal (325, 430) into first branch 542a and second branch 542b. First branch 542a is operable for manipulation such as element 544, multiply first branch 542a by predetermined modulation frequency 310. A first multiplied signal is provided whereby amplitude modulation 417 is contained and operable to being measured for change in fly height 440. Second branch 542b is operable for manipulation such as element 546, multiply second branch 542b by predetermined synchronous clock quadrature 525. A second multiplied signal is provided whereby phase shift between the second multiplied signal and the first multiplied signal is contained and operable to being measured for change in fly height 440. In conjunction, element 544 and element 546 perform synchronous detection of a change of fly height 440 due to predetermined modulation frequency 310.

In one embodiment, element 540 of process 500 further comprises 548, process and filter the first multiplied signal from first branch 542a, and/or process and filter the second multiplied signal from first branch 542b. Element 548 comprises a modulation processor which receives the first multiplied signal comprising the synchronously detected fly height modulation. Modulation processor can also receive the second multiplied signal comprising the fly height modulation quadrature signal.

The first multiplied signal and the second multiplied signal are filtered with a low-pass filter. The roll-off frequency of the low-pass filter is specified to be the same or lower than the predetermined modulation frequency 310. Thusly, the fly height detection bandwidth is set with the roll-off frequency of the low-pass filter. The change in amplitude of read-back signal (325, 430) is determined by the square root of the sum of the squares (RSS) of the first multiplied signal and/or the second multiplied signal. The fly height modulation phase is determined by the four quadrant arctangent of the ratio of the first multiplied signal to the second multiplied signal. Fly height modulation amplitude can be determined precisely from the change in amplitude of read-back signal (325, 430) by using the RSS of both the first multiplied signal and the second multiplied signal and deriving the vectored magnitude of the fly height modulation amplitude from the phase of the first multiplied signal and the second multiplied signal.

In one embodiment, as shown at 550 of process 500, fault signal 350 is provided in response to the change in fly height exceeding a threshold. Fault signal 350 is operable for controlling at least one operation of HDD 100. For example, fault signal 350 can effect HDD 100 to increase the fly height 440 of slider 125; fault signal 350 can effect HDD 100 to decrease the fly height of slider 125; and fault signal 350 can stop at least one operation of HDD 100 such as, shut down HDD 100, stop an impending writing of data, and stop reading of data.

In accordance with an embodiment of the present invention, fault signal 350 can effect HDD 100 to increase the fly height 440 of slider 125 in response to the occurrence of fault signal 350 being too frequent, indicating that a head crash could be imminent. In accordance with an embodiment of the present invention, fault signal 350 can effect HDD 100 to decrease the fly height of slider 125 in response to the occurrence of fault signal 350 being too infrequent, indicating that slider 125 may not be flying at an optimum fly height 440 for reading and/or writing a data track 135 with maximum amplitude.

In one embodiment, as shown at 560 of process 500, if the amplitude of the low pass signal is below a minimal usable amplitude, fault signal 350 is not passed to the controller of HDD 100. If the amplitude of the low pass signal is above a minimal usable amplitude, fault signal 350 is passed to the controller of HDD 100, wherein the controller of HDD 100 causes HDD to respond appropriately.

In one embodiment, process 500 as presented with all elements shown is operable to measuring a change in fly height 440 as a function of a demodulated signal. In one embodiment, process 500 is operable to measuring a change in fly height as a function of change of resistance of a magnetoresistive sensor, with the function element 535, element 537, and element 560 inactive.

The present invention, in the various presented embodiments improves the reliability and performance of an HDD. Embodiments of the present invention provide a means for monitoring the fly height of a slider in an HDD and enable the slider to fly at an optimum fly height for reading and writing modulation free data tracks with the highest possible amplitude. Embodiments of the present invention enable the magnetic transducer to fly as close as possible to the disk for maximum read and write data signal amplitude without encountering damage from excessive slider-to-disk contact. In so doing, the HDD experiences fewer attempts to retrieve data by reading data with fly height optimized for maximum read-back signal amplitude. The reliability of the HDD is improved by monitoring the fly height to avoid damage to the magnetic transducer from disk contact.

The present invention, in the various presented embodiments improves HDD reliability by providing a means for the HDD to react to conditions that can result in the magnetic transducer contacting the disk and damaging the magnetic transducer and/or the data written on the disk surface. Examples of these conditions are: temperature, atmospheric pressure, contamination, and mechanical shock, all of which affect fly height. Embodiments of the present invention enable the HDD to: increase the fly height; stop an impending writing or reading of data; and/or shut down the HDD. Such actions by the HDD preserve a customer's data until conditions are more benevolent for HDD operation or data recovery.

The present invention, in the various presented embodiments enables writing optimized servo data on a disk containing no data. Mechanical frequency of a slider is detected as a modulation of signal noise in the read-back signal. Per the presented embodiments of the present invention, modulation of signal noise in the read-back signal is used to monitor the fly height of a magnetic transducer. Such monitoring allows optimization of the fly height so that servo data with maximum amplitude is written.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for monitoring a fly height of a magnetic transducer, said method comprising:
   flying said magnetic transducer at a distance of separation from a recording media;
   modulating said fly height with a predetermined modulation frequency with a fly height control device;
   reading a read-back signal from said recording media with said magnetic transducer;
   measuring a change of said read back signal resulting from said modulating said fly height, wherein said measuring a change of said read back signal comprises:
   splitting said read-back signal into a first branch and a second branch;
   multiplying said first branch by said predetermined modulation frequency, resulting in a first multiplied signal;
   multiplying said second branch by a synchronous clock quadrature of said second branch, resulting in a second multiplied signal; and
   filtering said first multiplied signal and said second multiplied signal; and
   providing a fault signal in response to said change crossing a threshold.

2. The method of claim 1 wherein said flying said magnetic transducer comprises:
   flying a slider having a thermal fly height control device.

3. The method of claim 1 wherein said flying said magnetic transducer comprises:
   flying a slider coupled with a hard disk drive.

4. The method of claim 1 further comprising:
   demodulating said read-back signal.

5. The method of claim 1 wherein said measuring a change of said read back signal comprises:
   a phase lock loop.

6. The method of claim 1 wherein said measuring a change of said read back signal comprises:
   measuring an amplitude of at least one of said first multiplied signal and of said second multiplied signal.

7. The method of claim 1 wherein said measuring a change of said read back signal comprises:
   measuring a phase having said first multiplied signal and said second multiplied signal.

8. The method of claim 1 wherein said filtering said first multiplied signal and said second multiplied signal comprises:
   setting a fly height detection bandwidth.

9. An electronics module operable for receiving a read-back signal from a magnetic transducer, said electronics module comprising:
   a modulation generator operable for receiving a predetermined modulation frequency and operable for providing a modulation clock signal for a fly height control device;
   a measuring circuit operable for measuring a change in said read-back signal, wherein said change is in response to altering a fly height in response to said modulation clock signal received by said fly height control device, wherein said measuring circuit further comprising:
   a splitter operable for splitting said read-back signal into a first branch and a second branch;
   a first multiplier operable for multiplying said first branch by said modulation clock signal effecting a fly height modulation;
   a modulation processor operable for presenting to said measuring circuit a fly height amplitude from said fly height modulation; and
   a filter operable for passing a at least one mechanical frequency of said magnetic transducer; and
   a threshold detector operable for providing a fault signal coupled with a threshold of said change in said read-back signal.

10. The electronics module of claim 9 wherein said modulation generator further operable:
   for providing a modulation clock quadrature signal to said modulation processor.

11. The electronics module of claim 9 wherein said measuring circuit further operable:
   for measuring a change in resistance of a magnetic transducer.

12. The electronics module of claim 9 wherein said threshold detector is coupled with an output port.

13. The electronics module of claim 9 wherein said threshold detector comprises an RMS threshold detector.

14. The electronics module of claim 9 further comprising:
   a second multiplier operable for multiplying a second branch by a modulation clock quadrature signal resulting in a fly height modulation quadrature; and
   a modulation processor operable for presenting a fly height modulation phase from a fly height modulation quadrature.

15. The electronics module of claim 9 further comprising:
   a full wave rectifier for demodulating said read-back signal.

16. The electronics module of claim 9 further comprising:
   a half wave rectifier for demodulating said read-back signal.

17. A hard disk drive comprising:
   a base casting for providing attachment points for major components of said hard disk drive;
   a motor-hub assembly to which at least one disk is coupled, wherein said motor-hub assembly is attached to said base casting, wherein said disk has at least one surface of data tracks;
   a head stack assembly comprising:
      a comb to which at least one suspension is coupled, wherewith a slider including a magnetic transducer for reading and writing said data tracks onto said surface is coupled with said comb;
      an arm electronics module operable for receiving a read-back signal from said magnetic transducer, said arm electronics module comprising:
         a modulation generator operable for receiving a predetermined modulation frequency and operable for providing a modulation clock signal for a fly height control device;
         a measuring circuit operable for measuring a change in said read-back signal, wherein said change is in response to altering a fly height in response to said modulation clock signal received by said fly height control device, wherein said measuring circuit further comprising:
            a splitter operable for splitting said read-back signal into a first branch and a second branch;
            a first multiplier operable for multiplying said first branch by said modulation clock signal effecting a fly height modulation;
            a modulation processor operable for presenting to said measuring circuit a fly height amplitude from said fly height modulation; and
            a filter operable for passing a at least one mechanical frequency of said magnetic transducer; and
         a threshold detector operable for providing a fault signal coupled with a threshold of said change in said read-back signal.

18. The hard disk drive of claim 17 wherein said arm electronic module comprises a filter operable for passing at least one mechanical frequency of said magnetic transducer.

19. The hard disk drive of claim 17 wherein said read-back signal from said magnetic transducer does not comprise data from said data tracks.

20. The hard disk drive of claim 17 wherein said threshold detector is coupled with a controller of said hard disk drive.

21. The hard disk drive of claim 20 wherein said controller, in response to said threshold detector providing said fault signal which exceeds said threshold, increases said fly height of said magnetic transducer.

22. The hard disk drive of claim 20 wherein said controller, in response to said threshold detector providing said fault signal which does not exceed said threshold, decreases said fly height of said magnetic transducer.

23. The hard disk drive of claim 20 wherein said controller, in response to said threshold detector providing said fault signal, stops at least one operation of said hard disk drive.

* * * * *